BILLY R. STEPHENS
INVENTOR

BILLY R. STEPHENS
INVENTOR

BY *John C. Stahl*

ATTORNEY

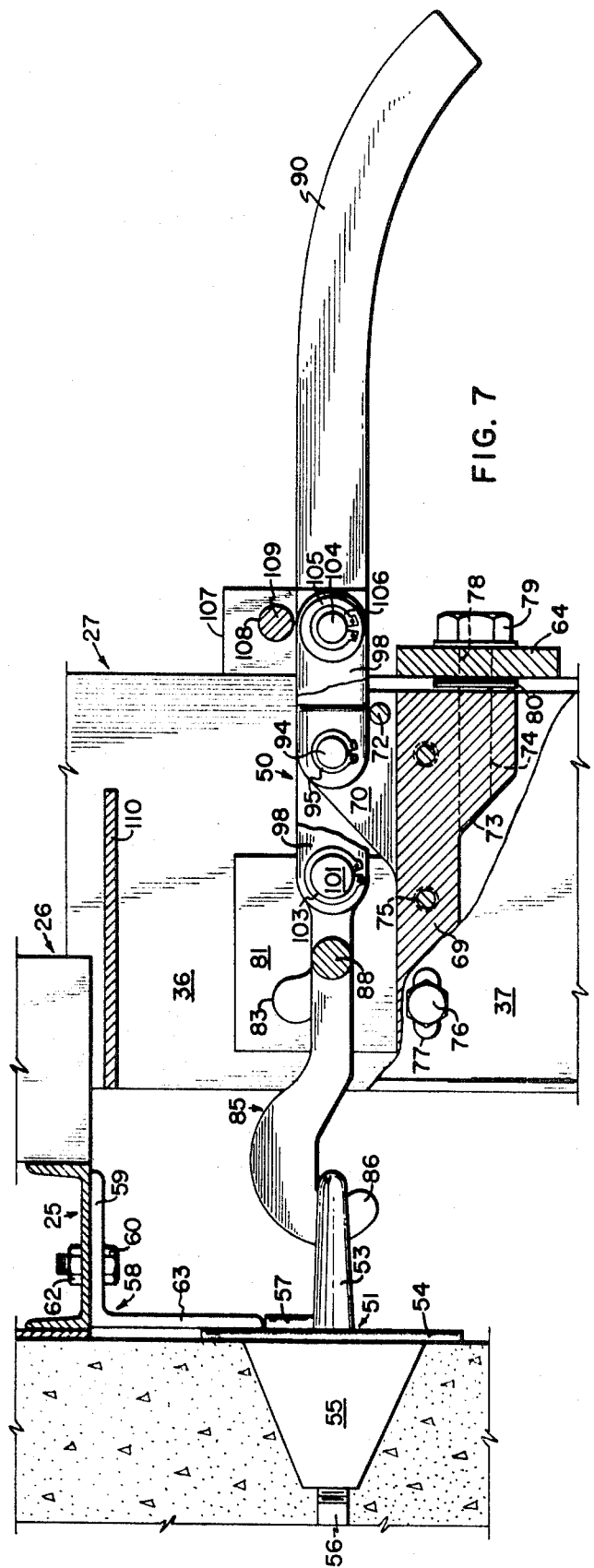

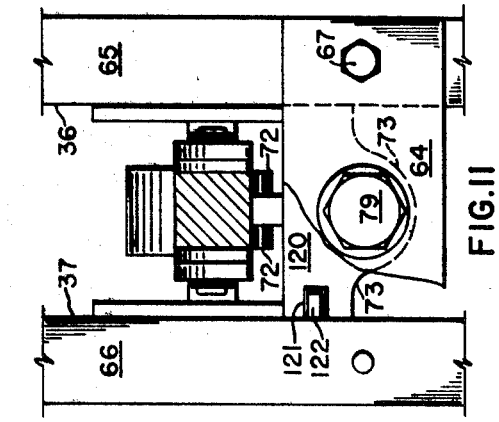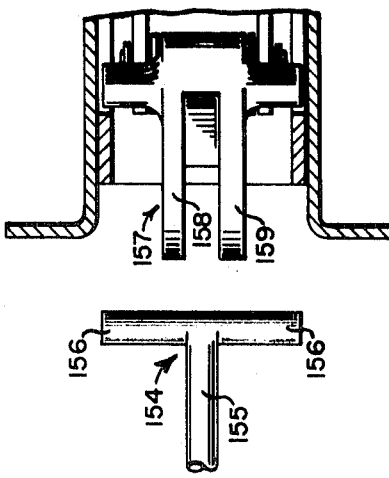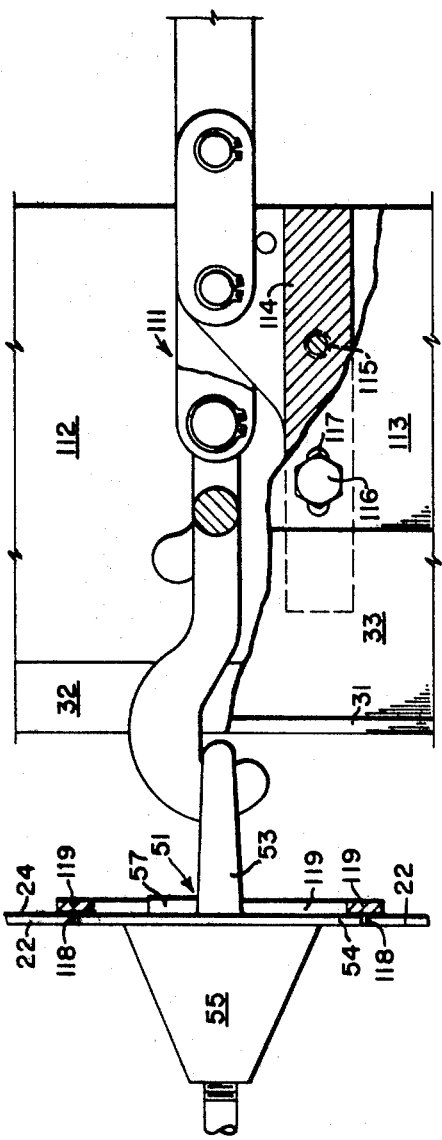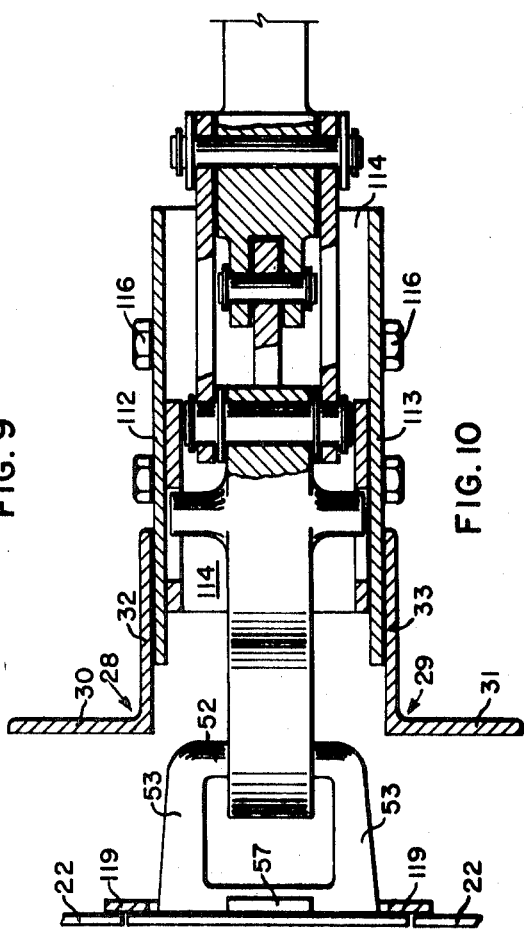

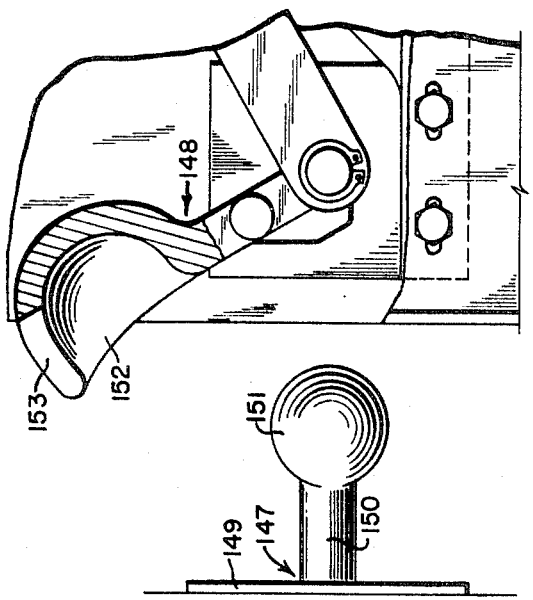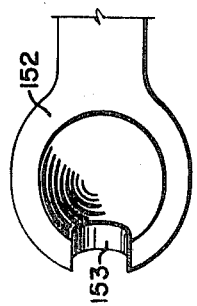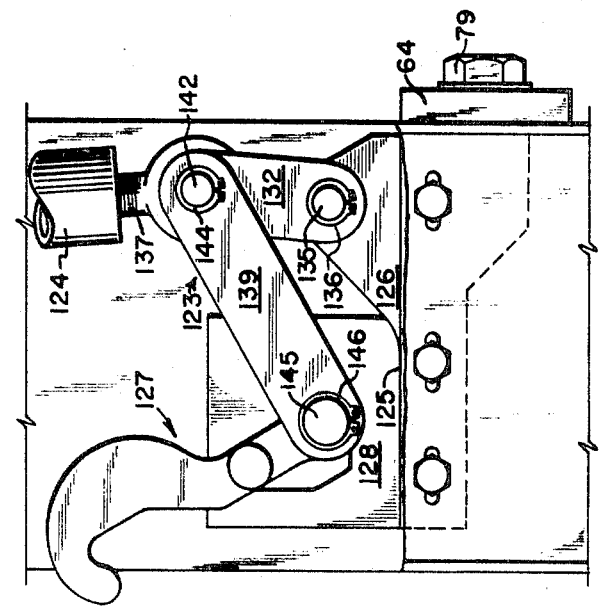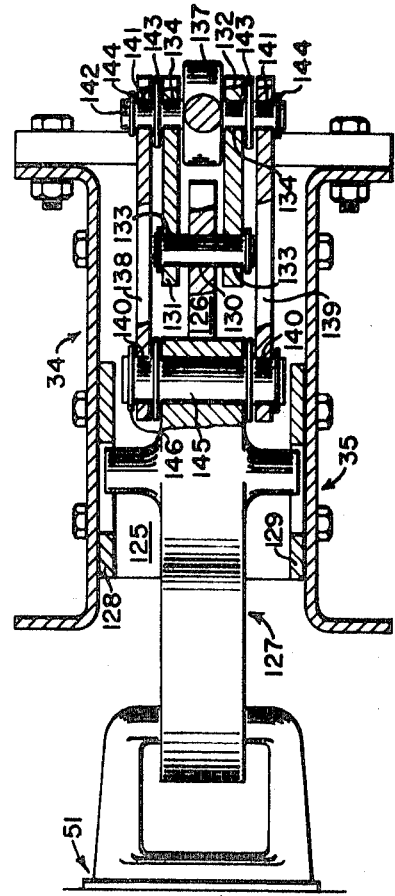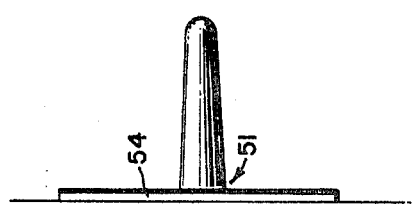

United States Patent Office 3,606,237
Patented Sept. 20, 1971

3,606,237
ANCHORING DEVICE FOR VERTICALLY
RAISING FORMS
Billy R. Stephens, San Antonio, Tex., assignor to Advance
Construction Equipment, Inc., New Braunfels, Tex.
Filed Oct. 13, 1967, Ser. No. 675,218
Int. Cl. E04g 11/22
U.S. Cl. 249—20
14 Claims

ABSTRACT OF THE DISCLOSURE

A center passing toggle assembly connected to a form structure, said toggle assembly coacting with at least one anchoring device embedded in concrete to restrain concrete pressure and permit intermittent raising of the said form structure.

The present invention relates to anchoring devices for vertically raising forms and more particularly to such anchoring devices for use with cantilever-type and ganged form panel structures.

An object of the present invention is the provision of an anchoring device which permits a reduction in labor in the setting, stripping and resetting of cantilever and ganged forms.

Another object is the provision of such an anchoring device which provides safer working conditions since the workers do not have to be on such forms when releasing the same.

Still another object is the provision of an anchoring device whereby a form may be removed from the poured concrete without first removing a template anchor.

A further object is the provision of remote controlled raising of form structures.

Other objects and features of the invention will become apparent to those skilled in the art as the disclosure is made in the following detailed description of preferred embodiments of the invention as illustrated in the accompanying sheets of drawings in which:

FIG. 7 is an enlarged, side elevational view, partly broken away and partly in section, of the preferred embodiment of the lower toggle assembly of the subject invention.

FIG. 8 is a top plan view, partly broken away and partly in section, of the embodiment of FIG. 7.

FIG. 9 is an enlarged, side elevational view, partly broken away and partly in section, of the preferred embodiment of the upper toggle assembly of the subject invention.

FIG. 10 is a top plan view, partly broken away and partly in section, of the embodiment of FIG. 9.

FIG. 11 is an enlarged, fragmentary, rear elevational view, partly broken away and partly in section, of a modification of the toggle base of the subject invention.

FIG. 12 is an enlarged, top plan view of a modified toggle head and anchor of the subject invention.

FIG. 13 is an enlarged, side elevational view, partly broken away, of another toggle assembly and anchor of the subject invention.

FIG. 14 is a top plan view, partly broken away and partly in section, of the embodiment of FIG. 13.

FIG. 15 is an enlarged, fragmentary, side elevational view, partly broken away and partly in section, of another embodiment of the toggle head and anchor of the subject invention.

FIG. 16 is an enlarged, fragmentary, bottom plan view of the socket of FIG. 15 of the drawings.

Figure 1:
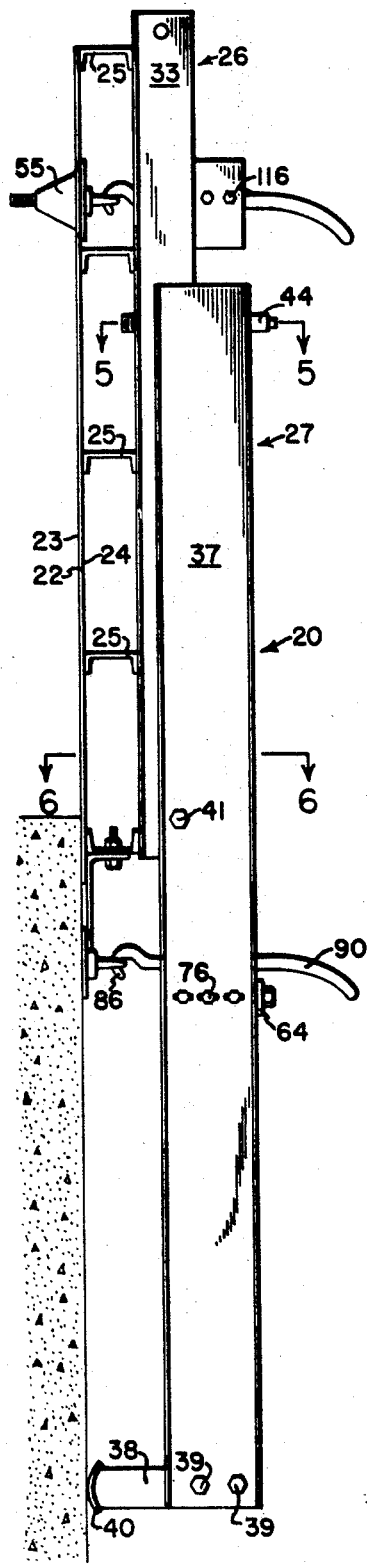
FIG. 1 is a side elevational view of a cantilever-type form panel structure utilizing the preferred embodiment of the subject invention.
Figure 2:
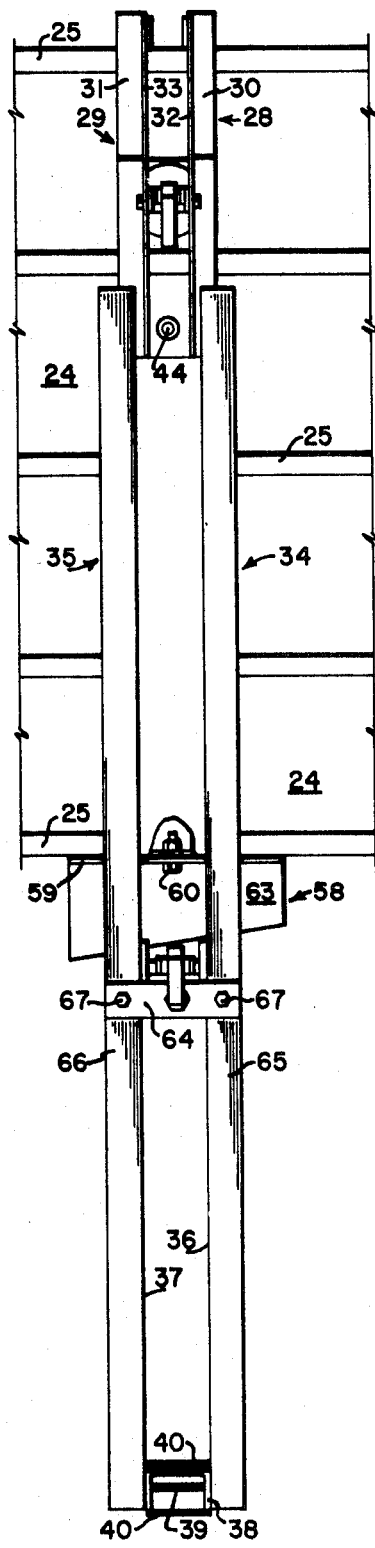
FIG. 2 is a fragmentary, rear elevational view of the panel structure of FIG. 1.
Figure 4:
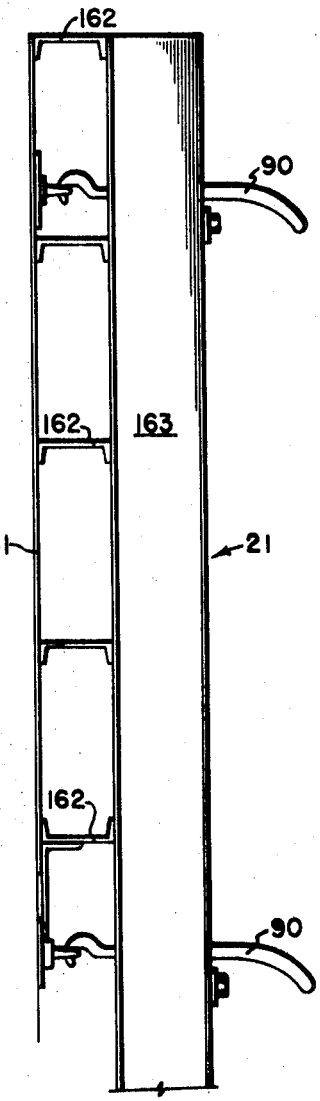
FIG. 4 is a side elevational view of a ganged form panel structure utilizing the subject invention.
Figure 3:
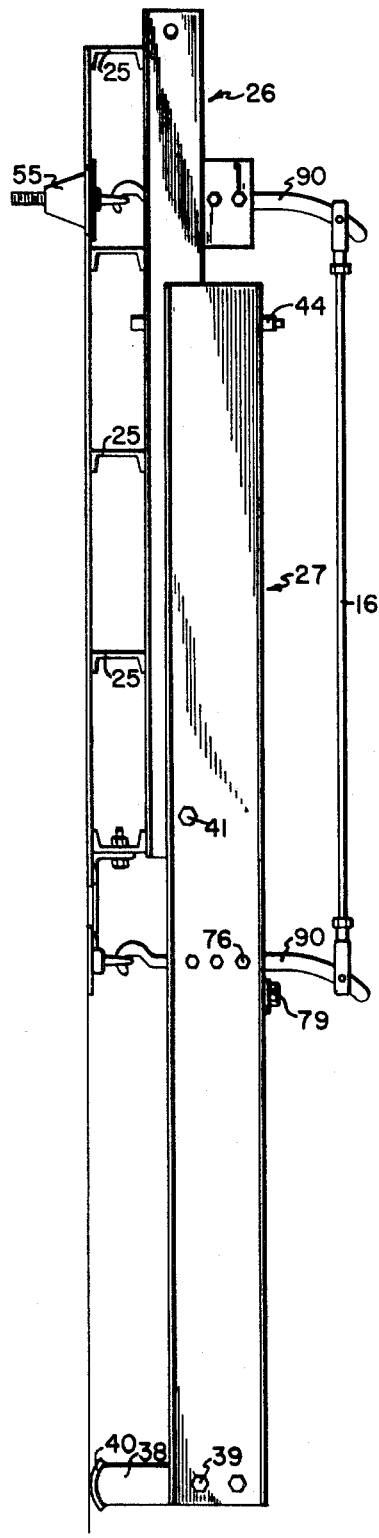
FIG. 3 is a side elevational view of a modification of the embodiment of FIG. 1.

Referring now to the drawings, wherein like reference characters designate like or corresponding parts throughout the several views, there is shown in FIGS. 1-3 a cantilever-type form panel 20 and in FIG. 4 a ganged form panel structure 21 constructed in accordance with the principles of the subject invention. In general, form panel structure 20 includes one or more usually elongated panels 22, each of which has a front face 23 against which concrete is to be poured and a rear face 24 which is provided with horizontal stiffeners 25 suitably affixed thereto. A plurality of spaced and vertically extending walers 26 are conventionally affixed to stiffeners 25 with a strongback 27 associated with each waler whereby the said strongback is remotely connected to the panel structure 20.

Figure 5:
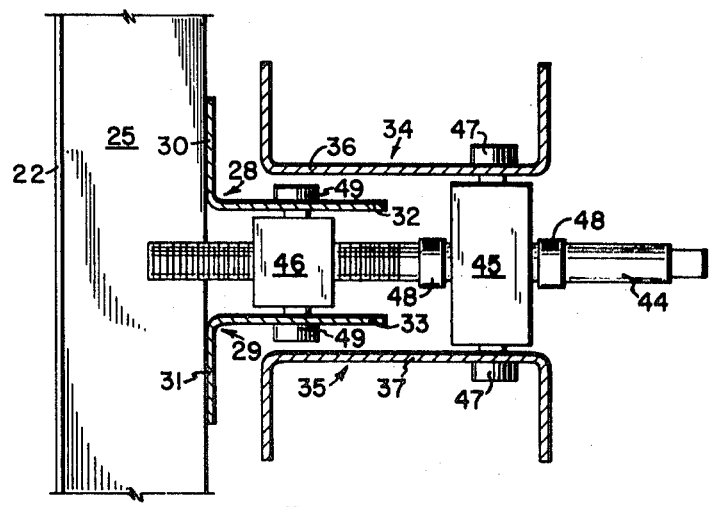
FIG. 5 is a horizontal sectional view taken on the line 5—5 of FIG. 1 looking in the direction of the arrows.
Figure 6:
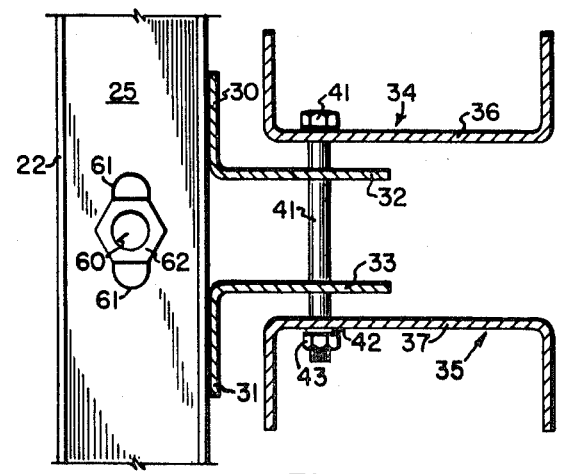
FIG. 6 is a horizontal sectional view taken on the line 6—6 of FIG. 1 looking in the direction of the arrows.

As best seen in FIGS. 2, 5 and 6 of the drawings, each waler 26 consists of a pair of spaced and vertically extending angles 28-29 or the like, legs 30-31 of which are connected to stiffeners 25 while legs 32-33 extend rearwardly; said angles 28, 29 terminate downwardly in the same horizontal plane and in proximity to the center of strongback 27. Each strongback 27 consists of a pair of channels 34-35, the webs 36-37 of which are back to back (see FIG. 5).

Channel 38 which opens downwardly is secured between the lower ends of webs 36, 37 of channels 34, 35 by means of transversely extending bolts 39 passing through aligned bores in such parts and having nuts or other securing means threaded thereon. Said channel 38 terminates forwardly of strongback 27 with a transversely extending, rolled kicker plate 40 conventionally secured thereto. Said kicker plate abuts the surface of the previously poured concrete (see FIG. 1) and serves as a constant bearing.

Referring now to FIGS. 5 and 6 of the drawings, means are provided to adjust waler 26 with respect to strongback 27 and such constant bearing. In FIG. 6, legs 32, 33 of the respective walers pass inwardly of the webs 36, 37 of channels 34, 35 with a pivot bolt 41 passing through aligned bores in such parts; washer 42 and nut 43 are placed thereon.

In FIG. 5, adjustment bolt 44 passes through a bore (not shown) in idler 45 and screws into traveler 46. Idler 45 is secured laterally to webs 36, 37 as by machine bolts or screws 47; stops 48 are secured to the shank of bolt 44 on each side of the idler. Traveler 46 is secured laterally to legs 32, 33 of the waler by machine bolts or screws 49; rotation of bolt 44 permits adjustment of waler 26 relative to pivot bolt 41 and the constant bearing heretofore mentioned.

Referring now to FIGS. 7 and 8 of the drawings, there is shown one embodiment of the lower toggle assembly 50 of the center passing type of the subject invention which is used in combination with anchor 51 and the panel structure 20 heretofore mentioned. Anchor 51 is integrally formed and consists of outwardly extending cross member 52 secured by arms 53 to face plate 54, the said anchor terminates inwardly in a truncated cone 55 which is internally threaded to receive anchoring bolt 56 previously embedded in the concrete of a previous pouring. A bearing surface 57 is interally formed on face plate 54 against which bears a grading wedge 58 or the like (see FIG. 2); wedge 58 consists of an angle or the like, one leg 59 of which abuts and is secured to the lowermost stiffener 25 of panel structure 20 as by means of a vertically extending bolt 60 passing through an elongated slot 61 (see FIG. 6) in such parts with nut 62 threaded thereon. Leg 63 is cut at an angle with the lower edge thereof adjusted to bear against bearing surface 57 of anchor 51 for vertical grading of panel structure 20.

The ends of rectangular cross plate 64 are secured to flanges 65–66 of channels 34, 35 by means of bolts 67 passing through aligned bores (not shown) with nuts 68 threading thereon. Horizontally extending toggle base 69 includes a medially and longitudinally extending, vertically upstanding block 70 which includes a transversely extending bore 71 (see FIG. 8) and laterally extending stops 72 rearwardly and angularly downward thereof, the purpose of which will hereinafter be described; base 69 terminates rearwardly in a downwardly depending portion 73 (see FIG. 11) which is internally threaded as indicated by reference numeral 74. Spaced, female threaded portions 75 in the sides of toggle base 69 receive machine bolts 76 or the like which pass through elongated slots 77 in webs 36, 37 respectively. Bore 78 in the center of cross plate 64 accommodates machine bolt 79; stop nut 80 or the like is secured to the shank of bolt 79 rearwardly of cross plate 64 and the said bolt inserted into threaded portion 74. Toggle base 69 thus formed may be adjusted either forwardly or rearwardly by rotating bolt 79; bolts 76 may then be tightened to additionally secure toggle assembly 50 in a desired position.

Still referring to FIGS. 7 and 8 of the drawings, spaced and vertically extending guide plates 81–82 are secured downwardly to toggle base 69 as by butt welding or the like; guide plates 81, 82 include aligned and essentially L-shaped channels or grooves 83–84. Toggle head 85 terminates forwardly in a downwardly depending hook 86 which is adapted to engage cross member 52 of the anchor. Integrally formed and laterally extending pins 87–88 on said toggle head insert into grooves 83, 84 in the opposing guide plates. A transversely extending bore 89 is provided in the rear of said toggle head, the purpose of which will hereinafter be described.

One end of handle 90 is bifurcated, indicated by reference numerals 91–92, to pass outwardly of block 70; a transversely extending bore 93 passes through such bifurcated portions with pin 94 passing through bores 71, 93 respectively; retaining rings 95 such as are well-known in the art are placed on each end of the said pin. Handle 90 further includes a transversely extending bore 96 rearwardly of such bifurcated portions 91, 92. Toggle links 97–98 are positioned laterally of the rearmost portion of toggle head 85 and the foremost portion of handle 90, respectively; transversely extending and aligned bores 99–100 are provided in proximity to each end of toggle links 97, 98. Pin 101 passes through bores 89, 99 with washer 102 placed intermediate toggle head 85 and links 97, 98. Retaining ring 103 is placed on each end of pin 101. In like manner, pin 104 is passed through bores 96, 100 with washer 105 and retaining ring 106 placed thereon outwardly of toggle links 97, 98.

In the center passing or engaged position illustrated in FIG. 7 of the drawings, the foremost undersurface of handle 90 bears against stops 72 restricting further clockwise movement thereof. As handle 90 is raised or pivoted about pin 94, toggle links 97, 98 pivotally connected thereto cause pins 87, 88 to ride forward in the horizontally extending portion of grooves 83, 84 whereby hook 86 moves forwardly approximately one inch and clears cross member 52 of the anchor. As handle 90 is further raised, pins 87, 88 ride upwardly into the vertical portion of grooves 83, 84 whereby the said hook translates about pin 101 heretofore mentioned. It is to be understood that the laterally extending pins 87, 88 riding in opposite grooves 83, 84 provide vertical support for form structures 20, 21 when toggle assembly 50 is in the center passing position and hook 86 engages cross member 52 of the anchor. Furthermore, when toggle assembly 50 is in such center passing or engaged position it withstands the fluid pressure of the concrete being poured against the front face 23 of panel 22.

As best seen in FIG. 7 of the drawings, spaced and rearwardly extending brackets 107 may be secured to flanges 65, 66 with an aligned bore 108 passing therethrough to accommodate cross pin 109. Pin 109 bears against the foremost, upper surface of handle 90 to secure toggle assembly 50 in the engaged position; when handle 90 is raised, pin 109 may be passed therebeneath, maintaining hook 86 in the elevated position.

A horizontally extending grout plate 110 (see FIG. 7) is positioned vertically above toggle assembly 50 and secured laterally to the innermost surfaces of webs 36, 37 as by welding or the like. Such plate not only provides additional strength and rigidity for strongback 27 but also such plate prevents fouling of the toggle assembly by concrete or the like.

In use, the lower toggle assembly 50 heretofore described supports form structures 20, 21 in a desired position while upper toggle assembly 111 of FIGS. 9 and 10 of the drawings is used to position an anchor vertically above the anchor heretofore mentioned prior to and during the pouring process.

As illustrated in FIGS. 1, 9 and 10 of the drawings, spaced and vertically aligned plates 112–113 are conventionally secured to legs 32, 33 of angles 28, 29 respectively. Horizontally extending toggle base 114 inserts between plates 112, 113 with female threaded portions 115 in the sides thereof to receive machine bolts 116 which pass through elongated slots 117 in the said plates 112, 113. The remainder of toggle assembly 111 is constructed in accordance with the principles heretofore described in detail in connection with FIGS. 7 and 8 of the drawings.

Still referring to FIGS. 9 and 10 of the drawings, hole 118 is provided in the upper portion of panel 22 intermediate angles 28, 29; said hole 118 conforms to and is slightly larger than face plate 54 of anchor 51 to receive the same. Ring 119, coaxial with hole 118, is secured as by welding to the rear face 24 of panel 22; face place 54 circumferentially abuts ring 119 with arms 53 of the said anchor passing through the bore thereof. After the concrete has been poured and set, such construction permits form structures 20, 21 to be removed without damage to such forms or to the surface of the concrete and with the anchor embedded in the said concrete preparatory to receive the lower toggle assembly 50 for the next successive pour of concrete.

There is shown in FIG. 11 of the drawings a modified toggle base 120 which may be used with toggle assembly 50 of FIGS. 7 and 8 of the drawings or the toggle assembly hereinafter to be described in connection with FIGS. 13 and 14. In such embodiment, base 120 inserts between webs 36, 37 of channels 34, 35. A longitudinally extending groove 121 is conventionally provided in opposite sides thereof to receive horizontally and inwardly extending male member 122 which is conventionally secured to the innermost sides of webs 36, 37 respectively. Longitudinal adjustment of base 120 is provided by means of rotating bolt 79 heretofore described.

Referring now to FIGS. 13 and 14, there is shown a modified toggle assembly 123 including pneumatic or hydraulic activating means 124 such as is well known in the art. In such embodiment, toggle base 125, toggle block 126, toggle head 127 and guide plates 128–129 are similar in construction to the corresponding parts in FIGS. 7 and 8 heretofore described. A transversely extending bore 130 is provided in block 126; toggle arms 131–132 include aligned bores 133–134 in proximity to the opposite ends thereof. The foremost ends of arms 131, 132 pass outwardly of block 126 with pin 135 passing through bores 130, 133 respectively with a retaining ring 136 secured to the said pin outwardly of toggle arms 131, 132. Rearwardly, the said arms 131, 132 pass outwardly of eye 137 which is associated with activating means 124. Toggle links 138–139 include aligned and transversely extending bores 140–141 in proximity to opposite ends thereof. The said toggle links 138, 139 terminate rearwardly and outwardly of arms 131, 132 with pin 142 passing through bores 134, 141 and eye 137; washer 143 is placed intermediate toggle arms 131, 132 and toggle links 138, 139 respectively; retaining ring 144 is conventionally secured in proximity to the ends of pin 142. Forwardly, toggle links 138, 139 pivotally connect to toggle head 127 by means of pin 145 with retaining ring 146 secured to each end thereof.

It is to be understood that pneumatic or hydraulic activating means 124 may be associated with the lower toggle assembly 50 and/or upper toggle assembly 111 whereby form structures 20, 21 associated therewith may be engaged or disengaged in desired sequence from a remote location.

There is shown in FIGS. 15 and 16 a modified anchor 147 and toggle head 148, respectively. In such embodiment, anchor 147 includes base plate 149 connecting by means of outwardly extending arm 150 to ball 151. Toggle head 148 terminates outwardly in socket 152 which is adapted to receive ball 151, the said socket includes a medially and upwardly extending slot 153 of slightly greater width than the corresponding diameter of arm 150. Anchor 147 and toggle head 148 thus formed may be used in combination with toggle assemblies 50, 111 and 123 heretofore described in connection with FIGS. 7–8, 9–10 and 13–14 of the drawings.

In the modification of FIG. 12, anchor 154 includes an integrally formed and outwardly extending arm 155 which terminates in cross member 156. Hook 157 which engages cross member 156 is bifurcated, indicated by reference numerals 158–159. Such bifurcated hook 157 may be used with toggle assemblies 50, 111 and 123 heretofore described.

It is to be further understood that mechanical means may be provided to link the handles of the upper and lower toggle assemblies. More particularly, in FIG. 3, a vertically extending rod 160 pivotally connects to the respective handles 90 in a conventional manner whereby the toggle hooks may be engaged or disengaged simultaneously.

Reference is now made to FIG. 4 of the drawings illustrating a ganged form structure 21 consisting of panel 161 which is provided with stiffeners 162 and vertically extending channels 163 suitably affixed thereto. Toggle assemblies 50, 111 and 123 heretofore described may be utilized therewith; it is to be further understood that a mechanical linkage may pivotally connect to the upper and lower assemblies or pneumatic or hydraulic activating means may be associated therewith.

The invention is not to be restricted to the anchors heretofore illustrated and described. In the broadest concept, any anchor which is capable of being partially embedded in concrete and includes a cross member suitable for engagement by toggle assemblies 50, 111 and 123 is within the scope of the invention. After use, anchors 51, 147 may be removed from anchor bolt 56 and the cavity formed in the poured concrete by truncated cone 55 or the like may be patched, in a conventional manner.

It should be understood, of course, that the foregoing disclosure relates to only preferred embodiments of the invention and that it is intended to cover all changes and modifications of the examples of the invention herein chosen for the purposes of the disclosure which do not constitute departures from the spirit and scope of the invention.

What is claimed is:

1. A concrete form comprising a panel having a front face and a rear face, support means secured to the rear face of said panel, at least first and second anchors each including a cross member, said second anchor being partially secured in a mass of concrete, a first center passing toggle assembly secured to said support means to engage said cross member of said first anchor, and a second center passing toggle assembly secured to said support means to engage said cross member of said second anchor.

2. The invention of claim 1 including fluid-operated means connected to at least said second toggle assembly.

3. The invention of claim 1 including fluid-operated means connected to said first and second toggle assemblies.

4. The invention of claim 1 wherein said first and second toggle assemblies are mechanically connected.

5. The invention of claim 1 including means connected to said first and second toggle assemblies to selectively engage and disengage the same from their respective anchors from a remote location.

6. A concrete form comprising a panel having a front face and a rear face, at least one first panel support unit secured to the rear face of said panel, a second panel support unit connected to said first panel support unit and adapted to both position said panel for the pouring of concrete and support said panel during pouring, at least one anchor including a cross member, said anchor being partially secured in a mass of concrete, and at least one center passing toggle assembly secured to said second panel support unit to engage said cross member of said anchor.

7. A concrete form comprising a panel having a front face and a rear face, at least one first panel support unit secured to the rear face of said panel, at least one second panel support unit connected to said first panel support unit and adapted to both position said panel for the pouring of concrete and support said panel during pouring, at least one anchor including engageable means, and at least one center passing toggle assembly secured to a selected panel support unit, said toggle assembly including engaging means adapted to coact with said engageable means.

8. A concrete form comprising a panel having a front and a rear face, at least one first panel support unit secured to the rear face of said panel, at least one second panel support unit connected to said first panel support unit and adapted to both position said panel for the pouring of concrete and support said panel during pouring, first and second anchors each including engageable means, said second anchor being partially secured in a mass of concrete, and first and second toggle assemblies each including engaging means, said first toggle assembly being secured to said first panel support unit, said second toggle assembly being secured to said second support unit.

9. The invention of claim 8 wherein said engageable means on said first and second anchors is a cross member and said engaging means on said first and second toggle assemblies is a hook.

10. The invention of claim 8 wherein said engageable means on said first and second anchors is a ball and said engaging means on said first and second toggle assemblies is a socket adapted to receive said ball.

11. The invention of claim 8 wherein said engageable means on said first and second anchors comprises a shaft terminating outwardly in a perpendicularly extending cross member, and said engaging means on said first and second toggle assemblies is a bifurcated hook.

12. The invention of claim 8 wherein said first toggle assembly is adjustably mounted on said first panel support unit and said second toggle assembly is adjustably mounted on said second panel support unit.

13. A ganged concrete form comprising a panel having a front face and a rear face, at least one first panel support unit secured to the rear face of said panel, at least one anchor including engageable means, said anchor being at least partially secured in a mass of concrete, and at least one toggle assembly secured to said first panel support unit, said toggle assembly including engaging means adapted to coact with said engageable means.

14. A ganged concrete form comprising a panel having a front face and a rear face, at least one first panel support unit secured to the rear face of said panel, at least first and second anchors each including engageable means, and at least first and second toggle assemblies secured to said first panel support unit, said first and second toggle assemblies each including engageable means adapted to coact with the respective engageable means.

References Cited

UNITED STATES PATENTS

| | | | |
|---|---|---|---|
| 912,277 | 2/1909 | Benson. | |
| 2,574,281 | 11/1951 | Olson | 74—520X |
| 2,649,643 | 8/1953 | Schutte | 249—10 |
| 3,154,832 | 11/1964 | Weidner | 249—20X |
| 3,343,771 | 9/1967 | Gates | 249—219X |
| 3,464,666 | 9/1969 | Williams | 249—10 |

J. SPENCER OVERHOLSER, Primary Examiner

J. E. ROETHEL, Assistant Examiner

U.S. Cl. X.R.

249—189, 219